United States Patent

Ase et al.

Patent Number: 5,597,879
Date of Patent: Jan. 28, 1997

[54] PROCESS FOR PRODUCING STYRENIC POLYMER

[75] Inventors: Hisashi Ase; Kazutoshi Ishikawa; Hideki Imabayashi, all of Ichihara, Japan

[73] Assignee: Idemitsu Petrochemical Co., Ltd., Tokyo, Japan

[21] Appl. No.: 523,207

[22] Filed: Sep. 5, 1995

Related U.S. Application Data

[63] Continuation of Ser. No. 391,098, Feb. 21, 1995, abandoned, which is a continuation of Ser. No. 105,426, Aug. 13, 1993, abandoned.

[30] Foreign Application Priority Data

Aug. 14, 1992 [JP] Japan ................................. 4-216835

[51] Int. Cl.⁶ ........................................................ C08F 2/02
[52] U.S. Cl. ................................. 526/65; 526/66; 526/86; 526/347.2
[58] Field of Search ................................. 526/65, 66, 86, 526/347.2

[56] References Cited

U.S. PATENT DOCUMENTS

| 5,032,650 | 7/1991 | Yamamoto et al. | 526/86 |
| 5,083,149 | 1/1992 | Kudo et al. | 354/402 |
| 5,254,647 | 10/1993 | Yamamoto et al. | 526/88 |

FOREIGN PATENT DOCUMENTS

| 0379128 | 7/1990 | European Pat. Off. . |
| 0447035 | 9/1991 | European Pat. Off. . |
| 0500944 | 9/1992 | European Pat. Off. . |

Primary Examiner—Thomas R. Weber
Attorney, Agent, or Firm—Oblon, Spivak, McClelland, Maier & Neustadt, P.C.

[57] ABSTRACT

There is disclosed a process for continuously producing a highly syndiotactic styrenic polymer by using a horizontal self-cleaning type reactor which comprises feeding into the reactor, a catalyst or both the catalyst and a styrenic monomer dividedly into at least two portions, preferably 2 to 5 portions in the direction of the axis of the reactor. The above process facilitates the control for the reactor inside temperatures because of the stepwise feeding of the catalyst (and the styrenic monomer) and remarkably enhances the productivity by simply increasing the feed rates of the catalyst and the styrenic monomer, thus making itself industrially highly valuable.

6 Claims, 1 Drawing Sheet

PROCESS FOR PRODUCING STYRENIC POLYMER

This application is a Continuation of application Ser. No. 08/391,098, filed on Feb. 21, 1995 now abandoned, which is a Continuation of application Ser. No. 08/105,426 filed on Aug. 13, 1993 now abandoned.

BACKGROUND OF THE INVENTION

1. Field of the Invention

The present invention relates to a process for producing a styrenic polymer. More particularly it pertains to a process for efficient stable continuous production of a styrenic polymer in which the stereochemical structure of the main polymer chain is of high degree of syndiotactic configuration.

2. Description of Related Arts

Heretofore, styrenic polymers of atactic configuration in its stereochemical structure that are produced by the radical polymerization method have been molded to various shapes by various molding methods such as injection molding, extrusion molding, blow molding, vacuum molding, cast molding or the like, and widely used as domestic electrical appliances, office machines, household goods, packaging containers, toys, furnitures, synthetic papers and other industrial materials. However, such styrenic polymers of atactic configuration have suffered the disadvantages of inferior heat resistance and chemical resistance.

The group of the present inventors recently succeeded in the development of the styrenic polymers having a high degree of syndiotactic configuration, and further demonstrated that the styrenic polymers of syndiotactic configuration were obtained by the use of a catalyst comprising a titanium compound and a contact product (alkylaluminoxane) between an organoaluminum compound and a condensation agent or a catalyst comprising a transition metal compound and a coordination complex compound composed of a cation and an anion in which a plurality of radicals are bonded to a metal. (Refer to Japanese Patent Application Laid-Open No. 187708/1987).

As a process for continuously producing a styrenic polymer in powdery form having such syndiotactic configuration, for example, Japanese Patent Application Laid Open No. 191,609/1990 discloses a polymerization method in which a styrenic monomer as the starting material together with a catalyst is fed into a horizontal self-cleaning type reactor.

However, the above-mentioned horizontal self-cleaning type reactor has a high piston flow property as compared with a tank reactor with agitation blades and therefore, causes ununiform distributions of temperature, conversion efficiency, etc. in the axis direction in the reactor, when charging a styrenic monomer as the starting material mixed with a catalyst. Particularly in the case of a methylaluminoxane-based catalyst, an extremely high initial-rate of reaction brings about a violent heat release due to rapid reaction in the vicinity of the feed inlet of a starting monomer and catalyst in the reactor, whereas in the latter half of the reactor the reaction proceeds at a decreasing rate with a reaction heat one-fourth or less as low as that in the first half therein.

As a general means for removing reaction heat in such a type of reactor, there is used a reactor with a cooling jacket with which the reactor is cooled using a coolant such as cooling water. Nevertheless, cooling with a single jacket induces ununiform temperature distribution in the reactor with the result that the first half of the reactor acts as the high temperature zone with much difference in temperature from the jacket, while the latter half thereof acts as the low temperature zone with little difference therefrom. In such a case, a temperature exceeding 100° C. in the high temperature zone is unfavorable from the viewpoint of operation and quality control, since it gives rise to the formation of a styrenic polymer of atactic configuration as well as deterioration of catalyst activity.

As the countermeasure against such a problem, the jacket is divided into multiple sections so as to maintain a uniform temperature in the reactor by supplying each section of the jacket with a coolant at a optimum temperature to regulate the temperatures in the reactor. However, as for a method in which a starting monomer and a catalyst are mixed and fed into the reactor, the high initial-rate of reaction makes it necessary to lower the coolant temperature with a decrease in distance between an jacket section and the feed inlet. An increase in the feed rates of a starting monomer and a catalyst for the purpose of enhancing the productivity increases the reaction heat release and thus, requires to lower the temperature of the coolant to be fed in the jacket section near to the feed inlet. As the result, the coolant temperature finally reaches the lowest possible limit, causing an increase in the temperature in the feed zone with the result that the production increase is no longer possible.

Under such circumstances, intensive research and investigation were made by the present inventors for the purpose of eliminating the above-mentioned problems involved in the conventional technique and developing a process capable of easily controlling the reactor inside temperature and thereby enhancing the productivity in the case where a styrenic polymer having a high degree of syndiotactic configuration is continuously produced by the use of a catalyst system which causes wide variation in the rate of reaction in a horizontal self-cleaning type reactor.

As a result, it has been found by the present inventors that the above-mentioned problem is solved by feeding in a reactor a catalyst or a catalyst and a starting monomer dividedly into at least two portions. The present invention has been accomplished by the aforesaid finding and information.

SUMMARY OF THE INVENTION

Specifically, the present invention provides a process for continuously producing a styrenic polymer having a high degree of syndiotactic configuration by continuously feeding a styrenic monomer as the starting material and a catalyst in a horizontal self-cleaning type reactor which process comprises feeding said catalyst, or said catalyst and said starting monomer in said reactor dividedly into at least two portions in the direction of the axis of the reactor, said catalyst and said styrenic monomer being fed through different nozzles from each other.

Figure 1:
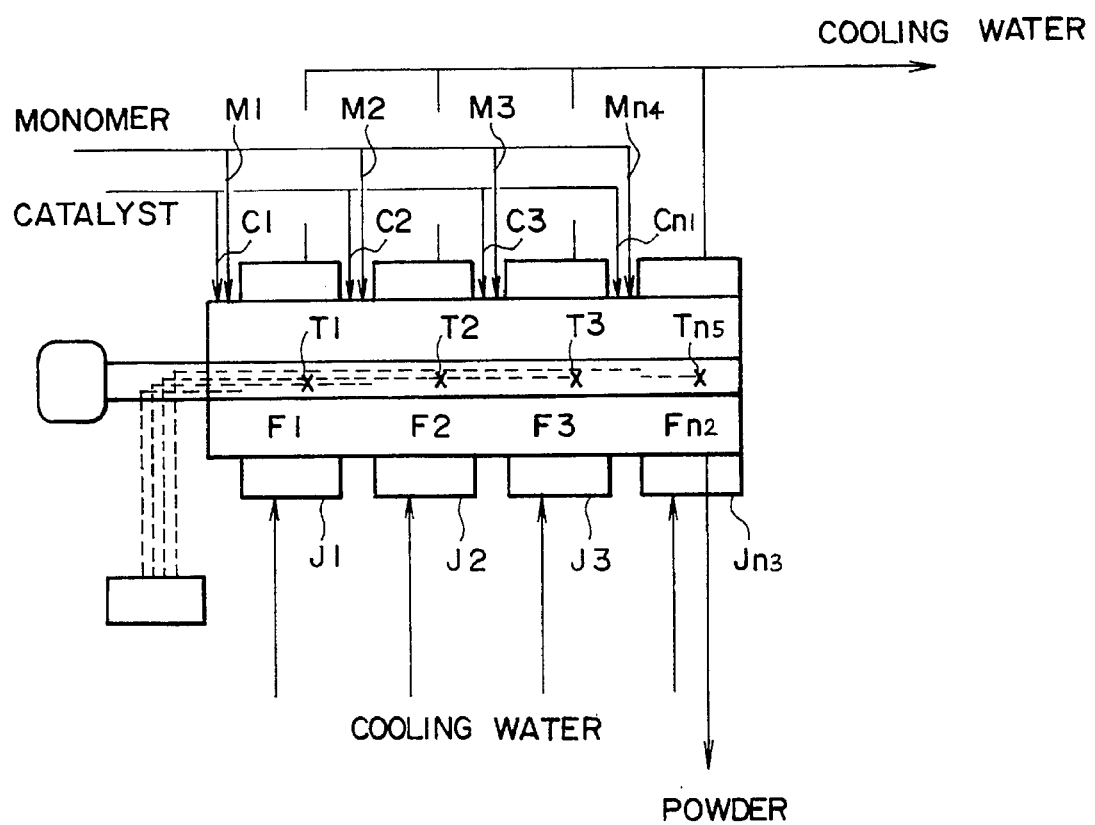
FIG. 1 is a schematic illustration showing an example of the self-cleaning type reactor for carrying out the process of the present invention.

Symbol $C1, C2, C3, Cn_1$: Catalyst feed nozzle
$F1, F2, F3, Fn_2$: Portion of reactor
$J1, J2, J3, Jn_3$: Jacket M1,M2,M3,Mn₄: Monomer feed nozzle
T1,T2,T3,Tn₅: Thermocouple

DESCRIPTION OF PREFERRED EMBODIMENT

The catalyst to be used in the present invention is preferably the catalyst which comprises as principal components (A) an (1) aluminoxane or a (2) coordination complex compound comprising a cation and an anion in which a plurality of radicals are bonded to a metal and a (B) transition metal compound. The (1) aluminoxane in the above-mentioned component (A) is obtained by bringing one of various organoaluminum compounds into contact with a condensation agent.

Examples of the aluminoxane of Component (A) include chain alkylaluminoxane represented by the general formula:

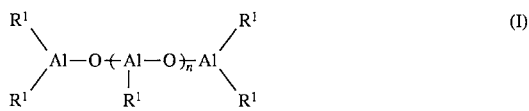

wherein n is a number from 2 to 50 indicating polymerization degree and $R^1$ is an alkyl group having 1 to 8 carbon atoms; cycloalkylaluminoxane having the repeating unit represented by the general formula:

wherein $R^1$ is as previously defined; and the like. Of these alkylaluminoxanes, that wherein $R^1$ is a methyl group, i.e. methylaluminoxane is particularly desirable.

In the process according to the present invention, there may be used a coordination complex compound comprising a cation and an anion in which a plurality of radicals are bonded to a metal as Component (A)-(2) of the catalyst in place of the foregoing aluminoxane. A variety of such coordination complex compounds are available, and those represented by the following general formula (III) or (IV) are preferably employed:

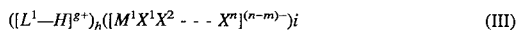

or

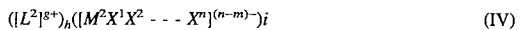

wherein $L^2$ is $M^3$, $T^1T^2M^4$ or $T^3{}_3C$ as hereinafter described; $L^1$ is a Lewis base; $M^1$ and $M^2$ are each a metal selected from Groups 5 to 15 of the Periodic Table; $M^3$ is a metal selected from Groups 8 to 12 of the Periodic Table; $M^4$ is a metal selected from Groups 8 to 10 of the Periodic Table; $X^1$ to $X^n$ are each a hydrogen atom, dialkylamino group, alkoxy group, aryloxy group, alkyl group having 1 to 20 carbon atoms, aryl group having 6 to 20 carbon atoms, alkylaryl group, arylalkyl group, substituted alkyl group, organometalloid group or halogen atom; $T^1$ and $T^2$ are each a cyclopentadienyl group, substituted cyclopentadienyl group, indenyl group or fluorenyl group; $T^3$ is an alkyl group; m is the valency of each of $M^1$ and $M^2$, indicating an integer of 1 to 7; n is an integer of 2 to 8; g is the ion valency of each of $[L^1—H]$ and $[L^2]$, indicating an integer of 1 to 7; h is an integer of 1 or more; and $i=hxg/(n-m)$.

Specific examples of $M^1$ and $M^2$ include B, Al, Si, P, As, Sb, etc.; those of $M^3$ include Ag, Cu, etc.; and those of $M^4$ include Fe, Co, Ni, etc. Specific examples of $X^1$ to $X^n$ include dialkylamino group such as dimethylamino and diethylamino; alkoxyl group such as methoxyl, ethoxyl and n-butoxyl; aryloxy group such as phenoxyl, 2,6-dimethylphenoxyl and naphthyloxyl; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; halogen such as F, Cl, Br and I; and organometalloid such as pentamethylantimony group, trimethylsilyl group, trimethylgermyl group, diphenylarsine group, dicyclohexylantimony group and diphenylboron group. Specific examples of substituted cyclopentadienyl group of $T^1$ and $T^2$ include methylcyclopentadienyl, butylcyclopentadienyl and pentamethylcyclopentadienyl.

Among the compounds represented by the general formula (III) or (IV), specific examples of preferably usable compounds include, as the compound of general formula (III), triethylammonium tetraphenylborate, tri(n-butyl)ammonium tetraphenylborate, trimethylammonium tetraphenylborate, triethylammonium tetra(pentafluorophenyl)borate, tri(n-butyl)ammonium tetra(pentafluorophenyl)borate, triethylammonium hexafluoroarsenate, etc., and as the compound of general formula (IV), pyridinium tetra(pentafluorophenyl)borate, pyrrolinium tetra(pentafluorophenyl)borate, N,N-dimethylanilinium tetra(pentafluorophenyl)borate, methyldiphenylammonium tetra(pentafluorophenyl)borate, ferrocenium tetraphenylborate, dimethylferrocenium tetra(pentafluorophenyl)borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetraphenylborate, silver tetra(pentafluorophenyl)borate, trityl tetraphenylborate, trityl tetra(pentafluorophenyl)borate, silver hexafluoroarsenate, silver hexafluoroantimonate, silver tetrafluoroborate, etc.

On the contrary, as transition metal compounds which constitutes Component (B) of the catalyst of the present invention include a compound of a group 3 to 6 metal of the Periodic Table and a compound of lanthanum series metal, of which is preferable a compound of a group 4 metal (titanium, zirconium, hafnium, vanadium, etc.). Various titanium compounds can be used and a preferred example is at least one compound selected from the group consisting of titanium compounds and titanium chelate compounds represented by the general formula:

or

wherein $R^2$, $R^3$, $R^4$ and $R^5$ are each a hydrogen atom an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group or a halogen atom; a, b and c are each an integer from 0 to 4; and d and e are each an integer from 0 to 3.

More desirable titanium compounds include a titanium compound represented by the formula:

wherein R represents a cyclopentadienyl group, a substituted cyclopentadienyl group or an indenyl group; X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group pentamethylcyclopentadienyl group or the like. In addition, X, Y and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group, ethoxy group, propoxy group, butoxy group, amyloxy group, hexyloxy group, octyloxy group and 2-ethylhexyl group), an aryl group having 6 to 20 carbon atoms (specifically, phenyl group and naphthyl group), an aryloxy group having 6 to 20 carbon atoms (specifically, phenoxy group), an arylalkyl group having 6 to 20 carbon atoms (specifically, benzyl group) or a halogen atom (specifically, chlorine, bromine, iodine and fluorine).

Specific examples of the titanium compound represented by the formula (VII) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamehtylcyclopentadienyltributyltitanium, cyclopentadienylmethyltitanium dichloride, cyclopentadienylethyltitanium dichloride, pentamethylcyclopentadienylmethyltitanium dichloride, pentamehtylcyclopentadienylethyltitanium dichloride, cyclopentadienyldimethyltitanium monochloride, cyclopentadienyldiethyltitanium monochloride, cycloeptnadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, and indenyltribenzyltitanium.

Of these titanium compounds, a compound not containing halogen atom is preferred and a titanium compound having one electron type ligand is particularly desirable.

Furthermore, a condensed titanium compound represented by the general formula may be used as the titanium compound.

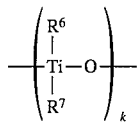

wherein $R^6$ and $R^7$ each represent a halogen atom, an alkoxy group having 1 to 20 carbon atoms or an acyloxy group; and k is an integer from 2 to 20.

Furthermore, the above titanium compounds may be used in the form of a complex formed with an ester or an ether.

The trivalent titanium compound represented by the formula (VI) typically includes a trihalogenated titanium such as titanium trichloride; and a cyclopentadienyltitanium compound such as cyclopentadienyltitnaium dichloride, and also those obtained by reducing a tetravalent titanium compound. These trivalent titanium compounds may be used in the form of a complex formed with an ester or an ether.

In addition, exmaples of the zirconium compound used as the transition metal compound include tetrabenzylzirconium, zirconium tetraethoxide, zirconium tetrabutoxide, bis-indenylzirconium dichloride, triisopropoxyzirconium chloride, zirconium benzyl dichloride and tributoxyzirconium chloride. Examples of the hafnium compound include tetrabenzylhafnium, hafnium tetraethoxide and hafnium tetrabutoxide. Examples of the vanadium compound include vanadyl bisacetylacetonate, vanadyl triacetylacetonate, vanadyl triethoxide and vanadyl tripropoxide. Of these transition metal compounds, the titanium compounds are particularly suitable.

Aside from the foregoing, the transition-metal compounds constituting Component (B) of the catalyst include the transiton-metal compound with two ligands having conjugated electrons, for example, at least one comound selected from the transitional-metal compound represented by the general formula $$M^5R^8R^9R^{10}R^{11} \qquad (IX)$$

wherein $M^5$ is titanium, zirconium or hafnium; $R^8$ and $R^9$ are each a cyclopentadienyl group, substituted cyclopentadienyl group, indenyl group or fluorenyl group; and $R^{10}$ and $R^{11}$ are each a hydrogen atom, a halogen atom, hydrocarbon radical having 1 to 20 carbon atoms, alkoxy group having 1 to 20 carbon atoms, amino group or thioalkoxyl group having 1 to 20 carbon atoms, but $R^8$ and $R^9$ may be each cross-linked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of $R^8$ and $R^9$ designates a cyclopentadienyl group, substituted cyclopentadienyl group, more specifically, methylcyclopentadienyl group;

1,3-dimethylcyclopentadienyl group;
1,2,4-trimethylcyclopentadienyl group;
1,2,3,4-tetramethylcyclopentadienyl group;
pentamethylcyclopentadienyl group;
trimethylsilylcyclopentadienyl group;
1,3-di(trimethylsilyl)cyclopentadienyl group;
1,2,4-tri(trimethylsilyl)cyclopentadienyl group;
tert-butylcyclopentadienyl group;
1,3-di(tert-butyl)cyclopentadienyl group;
1,2,4-tri(tert-butyl)cyclopentadienyl group or the like,
indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and cross-linked by a alkylidene group having 1 to 5 carbon atoms, more specifically, methine group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of $R^{10}$ and $R^{11}$ independently indicates, as described above but more specifically, a hydrogen atom; an alkyl group having 1 to 20 carbon atoms such as methyl group, ethyl group, propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxyl group, hexyloxyl group, octyloxyl group or 2-ethylhexyloxyl group; an aryloxyl group having 6 to 20 carbon atoms such as phenoxyl group; an amino group; or a thioalkoxyl group having 1 to 20 carbon atoms.

Specific examples of the transition-metal compounds represented by the general formula (IX) include bis(cyclopentadienyl)dimethyltitanium;
bis(cyclopentadienyl)diethyltitanium;
bis(cyclopentadienyl)dipropyltitanium;
bis(cyclopentadienyl)dibutyltitanium;
bis(methylcyclopentadienyl)dimethyltitanium;
bis(tert-butylcyclopentadienyl)dimethyltitanium;
bis(1,3-dimethylcyclopentadienyl)dimethyltitanium;
bis(1,3-di-tert-butylcyclopentadienyl)dimethyltitanium;
bis(1,2,4-trimethylcyclopentadienyl)dimethyltitanium;
bis(1,2,3,4-tetramethylcyclopentadienyl)dimethyltitanium;
bis(trimethylsilylcyclopentadienyl)dimethyltitanium;
bis(1,3-di(trimethylsilyl)cyclopentadienyl)dimethyltitanium;
bis(1,2,4-tri((trimethylsilyl)cyclopentadienyl)dimethyltitanium;
bis(indenyl)dimethyltitanium;
bis(fluorenyl)dimethyltitanium;
methylenebis(cyclopentadienyl)dimethyltitanium;
ethylidenebis(cyclopentadienyl)dimethyltitanium;
methylenebis(2,3,4,5-tetramethylcyclopentadienyl)dimenthyltitanium;
ethylidenebis(2,3,4,5-tetramethylcyclopentadienyl)dimethyltitanium;
dimethylsilylbis(2,3,4,5-tetramethylcyclopentadienyl)dimethyltitanium;
methylenebisindenyldimethyltitanium;
ethylidenebisindenyldimethyltitanium;
dimethylsilylbisindenyldimethyltitanium;
methylenebisfluorenyldimethyltitanium;
ethylidenbisfluorenyldimethyltitanium;
dimethylsilylbisfluorenyldimethyltitanium;
methylene(tertbutylcyclopentadienyl)(cyclopentadienyl)dimethyltitanium;
methylene(cyclopentadienyl)(indenyl)dimethyltitanium;
ethylidene(cyclopentadienyl)(indenyl)dimethyltitanium;
dimethylsilyl(cyclopentadienyl)(indenyl)dimethyltitanium;
methylene(cyclopentadienyl)(fluorenyl)dimethyltitanium;
ethylidene(cyclopentadienyl)(fluorenyl)dimethyltitanium;
dimethylsilyl(cyclopentadienyl)(fluorenyl)dimethyltitanium;
methylene(indenyl)(fluorenyl)dimethyltitanium;
ethylidene(indenyl)(fluorenyl)dimethyltitanium;
dimethylsilyl(indenyl)(fluorenyl)dimethyltitanium;
bis(cyclopentadienyl)dibenzyltitanium;
bis(tert-butylcyclopentadienyl)dibenzyltitanium;
bis(methylcyclopentadienyl)dibenzyltitanium;
bis(1,3-dimethylcyclopentadienyl)dibenzyltitanium;
bis(1,2,4-trimethylcyclopentadienyl)dibenzyltitanium;
bis(1,2,3,4-tetramethylcyclopentadienyl)dibenzyltitanium;
bis(pentamethylcyclopentadienyl)dibenzyltitanium;
bis(trimethylsilylcyclopentadienyl)dibenzyltitanium;
bis 1,3-di-(trimethyl)cyclopentadienyl dibenzyltitanium;
bis 1,2,4-tri(trimethylsilyl)cyclopentadienyl dibenzyltitanium;
bis(indenyl)dibenzyltitanium;
bis(fluorenyl)dibenzyltitanium;
methylenebis(cyclopentadienyl)dibenzyltitanium;
ethylidenebis(cyclopentadienyl)dibenzyltitanium;
methylenebis(2,3,4,5-tetramethylcyclopentadienyl)dibenzyltitanium;
ethylidenebis(2,3,4,5-tetramethylcyclopentadienyl)dibenzyltitanium;
dimethylsilylbis(2,3,4,5-tetramethylcyclopentadienyl)dibenzyltitanium;
methylenebis(indenyl)dibenzyltitanium;
ethylidenebis(indenyl)dibenzyltitanium;
dimethylsilylbis(indenyl)dibenzyltitanium;
methylenebis(fluorenyl)dibenzyltitanium;
ethylidenebis(fluorenyl)dibenzyltitanium;
dimethylsilylbis(fluorenyl)dibenzyltitanium;
methylene(cyclopentadienyl)(indenyl)dibenzyltitanium;
ethylidene(cyclopentadienyl)(indenyl)dibenzyltitanium;
dimethylsilyl(cyclopentadienyl)(indenyl)dibenzyltitanium;
methylene(cyclopentadienyl)(fluorenyl)dibenzyltitanium;
ethylidene(cyclopentadienyl)(fluorenyl)dibenzyltitanium;
dimethylsilyl(cyclopentadienyl)(fluorenyl)dibenzyltitanium;
methylene(indenyl)(fluorenyl)dibenzyltitanium;
ethylidene(indenyl)(fluorenyl)dibenzyltitanium;
dimethylsilyl(indenyl)(fluorenyl)dibenzyltitanium;
biscyclopentadienyltitanium dimethoxide;
biscyclopentadienyltitanium diethoxide;
biscyclopentadienyltitanium dipropoxide;
biscyclopentadienyltitanium dibutoxide;
biscyclopentadienyltitanium diphenoxide;
bis(methylcyclopentadienyl)titanium dimethoxide;
bis(1,3-dimethylcyclopentadienyl)titanium dimethoxide;
bis(1,2,4-trimethylcyclopentadienyl)titanium dimethoxide;
bis(1,2,3,4-tetramethylcyclopentadienyl)titanium dimethoxide;
bispentamethylcyclopentadienyltitanium dimethoxide;
bis(trimethylcyclopentadienyl)titanium dimethoxide;
bis[1,3-di(trimethylsilyl)cyclopentadienyl]titanium dimethoxide;
bis[1,2,4-tri(trimethylsilyl)cyclopentadienyl]titanium dimethoxide;
bisindenyltitanium dimethoxide;
bisfluorenyltitanium dimethoxide;
methylenebiscyclopentadienyltitanium dimethoxide;
ethylidenebiscyclopentadienyltitanium dimethoxide;
methylenebis(2,3,4,5-tetramethylcyclopentadienyl)titanium dimethoxide;
ethylidenebis(2,3,4,5-tetramethylcyclopentadienyl)titanium dimethoxide;
dimethylsilylbis(2,3,4,5-tetramethylcyclopentadienyl)titanium dimethoxide;
methylenebisindenyltitanium dimethoxide;
methylenebis(methylindenyl)titanium dimethoxide;
ethylidenebisindenyltitanium dimethoxide;
dimethylsilylbisindenyltitanium dimethoxide;

methylenebisfluorenyltitanium dimethoxide;
methylenebis(methylfluorenyl)titanium dimethoxide;
ethylidenebisfluorenyltitanium dimethoxide;
dimethylsilylbisfluorenyltitanium dimethoxide;
methylene(cyclopentadienyl)(indenyl)titanium dimethoxide;
ethylidene(cyclopentadienyl)(indenyl)titanium dimethoxide;
dimethylsilyl(cyclopentadienyl)(indenyl)titanium dimethoxide;
methylene(cyclopentadienyl)(fluorenyl)titanium dimethoxide;
ethylidene(cyclopentadienyl)(fluorenyl)titanium dimethoxide;
dimethylsilyl(cyclopentadienyl)(fluorenyl)titanium dimethoxide;
methylene(indenyl)(fluorenyl)titanium dimethoxide;
ethylidene(indenyl)(fluorenyl)titanium dimethoxide;
dimethylsilyl(indenyl)(fluorenyl)titanium dimethoxide, etc.

Examples of the transition-metal compounds represented by the formula (IX) wherein $M^5$ is zirconium include ethylidenebiscyclopentadienylzirconium dimethoxide, dimethylsilylbiscyclopentadienylzirconium dimethoxide, etc.

Examples of the hafnium compounds according to the general formula (IX) include ethylidenebiscyclopentadienylhafnium dimethoxide, etc. Particularly desirable transition-metal compounds among them are titanium compounds.

In addition to the combinations of the above, the compound may be a bidentate coordination complex compound such as 2,2-thiobis(4-methyl-6-tert-butylphenyl)titanium dimethoxide or the like.

In the process of the present invention, if desired, In addition to the aforestated Components (A) and (B), another catalytic component such as an organoaluminum can be added.

The organoaluminum includes an organoaluminum component represented by the formula:

$$R^{12}{}_j Al(OR^{13})_x H_y X'_z \qquad (X)$$

wherein $R^{12}$ and $R^{13}$ each independently represent an alkyl group having 1 to 8, preferably 1 to 4 carbon atoms; $X'$ represents a halogen; j, x, y and z each satisfy the relations $0<j\leq 3$, $0\leq x<3$, $0\leq y<3$ and $0\leq z<3$, and $j+x+y+z=3$.

The activity of the catalyst is further improved by adding the above compound.

The organoaluminum compound represented by the above general formula (X) can be exemplified as shown below. Those corresponding to y=z=0 are represented by the formula: $R^{12}{}_j Al(OR^{13})_{3-j}$ (wherein $R^{12}$ and $R^{13}$ are as previously defined and j is preferably a number of $1.5\leq j\leq 3$). Those corresponding to x=y=0 are represented by the formula: $R^{12}{}_j AlX'_{3-j}$ (wherein $R^{12}$ and $X'$ are as previously defined and j is preferably a number of $0<j<3$). Those corresponding to x=z=0 are represented by the formula: $R^{12}{}_j AlH_{3-j}$ (wherein $R^{12}$ is as previously defined and j is preferably a number of $2\leq j<3$). Those corresponding to y=0 are represented by the formula: $R^{12}{}_j Al(OR^{13})_x X'_z$ (wherein $R^{12}$, $R^{13}$ and $X'$ are as previously defined and $0<j\leq 3$, $0\leq x<3$, $0\leq z<3$ and $j+x+z=3$).

In the organoaluminum compound represented by the general formula (XI), the compound wherein y=z=0 and j=3 is selected from, for example, trialkylaluminum such as trimethylaluminum, triethylaluminum and tributylaluminum, or combination thereof. In the case of y=z=0 and $1.5\leq j<3$, included are dialkylaluminum alkoxide such as diethylaluminum ethoxide and dibutylaluminum butoxide; alkylaluminum sesquialkoxide such as ethylaluminum sesquiethoxide and butylaluminum sesquibutoxide; as well as partially alkoxylated alkylaluminum having an average composition represented by $R^{12}{}_{2.5} Al(OR^{13})_{0.5}$. Examples of the compound corresponding to the case where x=y=0 include a partially halogenated alkylaluminum including dialkylaluminum halogenide (J=2) such as diethylaluminum chloride, dibutylaluminum chloride and diethylaluminum bromide; alkylaluminum sesquihalogenide (j=1.5) such as ethylaluminum sesquichloride, butylaluminum sesquichloride and ethylaluminum sesquibromide; and alkylaluminum dihalogenide (j=1) such as ethylaluminum dichloride, propylaluminum dichloride and butylaluminum dibromide. Examples of the compound corresponding to the case in which x=z=0 includes a partially hydrogenated alkylaluminum including dialkylaluminum hydride (j=2) such as diethylaluminum hydride and dibutylaluminum hydride; alkylaluminum dihydride (j=1) such as ethylaluminum dihydride and propylaluminum dihydride. Examples of the compound corresponding to the case in which y=0 include a partially alkoxylated or halogenated alkylaluminum such as ethylaluminumethoxy chloride, butylaluminumbutoxy chloride and ethylaluminumethoxy bromide (j=x=z=1). Of these, triisobutylaluminum and triisobutylaluminum hydride are particularly suitable.

The catalyst to be used in the present invention comprises Components (A) and (B) as the main components, and in addition, other catalytic component may be added if desired. The ratio of Components (B) to (A) in said catalyst depends on various conditions, and cannot be defined unconditionally, but usually it is, in terms of the ratio of the metal in Component (B) to aluminum in Component (A) i.e., metal/aluminum (molar ratio), 1:1 to 1; $10^6$, preferably 1:10 to $1:10^4$ in the case of (1) aluminoxane; 0.1:1 to 1:0.1 in the case of (2) coordination complex compound comprising a cation and an anion in which a plurality of radicals are bonded to a metal; and 1:0.1 to $1:10^3$ in the case of the organoaluminum compound represented by the general formula (X) being added as a catalyst component.

The styrenic polymer is produced by (co)polymerizing styrenic monomer(s) in the presence of the catalyst comprising the above-mentioned components (A) and (B) as the main components.

The styrenic monomer to be used in the present invention indicates styrene and/or styrene derivatives.

Specific examples of the styrene derivatives include alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene and p-tertiary-butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; alkoxystyrenes such as p-methoxystyrene, m-methoxystyrene, o-methoxystyrene, p-ethoxystyrene, m-ethoxystyrene, and o-ethoxystyrene; carboxyesterstyrenes such as p-carboxymethylstyrene, m-carboxyesterstyrenes such as p-carboxymethylstyrene, m-carboxymethylstyrene, and o-carboxymethylstyrene; alkyletherstyrenes such as p-vinylbenzylpropylether; or mixture of two or more kinds of them.

The styrenic monomer as the starting material should be completely free from water, oxygen and phenylacetylene that are poisoning substances for the catalyst. It is preferable for that purpose, for example, that the starting monomer be subjected to bubbling with, nitrogen, passed through an activated-alumina column and treated by hydrogenation reaction with palladium, or the like.

In the present invention, polymerization reaction is effected by agitating the monomer as the starting material and catalyst preferably at a temperature lower than the melting point of the polymer, that is, at a temperature of not higher than 120° C., preferably 0° to 100° C., more preferably 20° to 80° C. while providing shearing force enough to maintain a polydispersive state, so as to make a substantially solid-state polydispersoid, and thus the styrenic polymer having syndiotactic configuration are produced. The molecular weight of the styrenic polymer to be produced is effectively modified by carrying out polymerzation reaction in the presence of hydrogen.

Herein agitation at polymerization reaction has three stages: i) agitation in a low viscosity state at polymerization temperature where monomers, oligomers and polymers are in liquid form, a part of the polymers is in slurry form without becoming liquid in monomers, or polymers containing other solvents are substantially in liquid form, ii) agitation in a highly viscous state with providing shearing force, as polymerization proceeds, and iii) lastly agitation of solid-states polydispersoid when substantially the whole has become polydispersive.

Accordingly, in order to continuously produce the styrenic polymer having highly syndiotactic configuration, it is desired to maintain the above-mentioned agitating state to an appropriate state. That is, when almost all the reaction mixture in the reactor are in the liquid state of the above (i), the amount of unreacted monomer is large so that the amount of monomers contained in the polymers discharged from the reactor is increased and hence the load of separation and recovery of the monomers is also increased, whereby production efficiency is lowered. Also, in the highly viscous state of (ii), agitation force (stirring force) is increased and in an extreme case, the reaction mixture becomes gel state so that formation of macromolecular particles or adhesion of polymers to the reactor or the agitating blades are caused and the continuous operation sometimes becomes difficult.

The above-mentioned shearing force, especially in highly viscous state is necessary for making the reaction product into solid-state polydispersoid and varies depending on the degree of polymerization and crystallinity of the polymer to be produced. By the term "solid-state polydispersoid" is meant to include the dispersion in powdery or flaky dispersion state, preferably the powder having a uniform particle size.

As a means for supplying the sufficient shearing force as described above and a means for preventing the polymer from sticking to the inside wall and/or the agitation blades in the reactor, there is used a self-cleaning type reactor in the process of the present invention.

The self-cleaning type reactor to be used in the present invention indicates a reactor (kneader) having kneading function in addition to self-cleaning function and may be selected for use from the conventional and known self-cleaning type reactor, specifically exemplified by the self-cleaning type kneader disclosed, for example, in U.S. Pat. Nos. 3,195,865, 3,198,491, etc. The self-cleaning type kneader is equipped with so-called paddles that are mounted on two parallel shafts. The paddles are equipped with protrusions in the shape of triangle or convex lens, which rotate in the same direction and simultaneously carry out kneading and self-cleaning, while scraping the surface of the other paddles and the inside wall of the cylinder. The kneaded product can be discharged by the application of a screw mechanism or integrated screw structure including all the paddles. Other usable self-cleaning type kneaders are disclosed in Japanese Patent Publication No. 54974/1985 and Japanese Patent Application Laid-Open Nos. 59824/1981, 239211/1985, 101108/1985, etc.

The preferable self-cleaning type kneaders are those which are free from any open space above the paddles in the region from the start of powdering to the end thereof, that is, the region excluding the vicinities of the feed inlet and product outlet and are capable of self-cleaning the inside wall of the cylinder as well as all the paddle surfaces coming into contact with the materials to be treated. Specific examples include the unidirectionally engaging type twin-screw kneaders that are typified by the self-cleaning type KRC kneader manufactured by Kurimoto Ltd. and the self-cleaning type SCR reactor manufactured by Mitsubishi Heavy Industries Ltd. The above-mentioned kneaders are preferably equipped with a jacket capable of controlling the temperature in the cylinder in which polymerization reaction is effected up to about 120° C.

As to the self-cleaning type reactor to be employed in the present invention, the clearances between the paddles as well as a paddle and the inside wall of the cylinder are each desirably 10 mm or less, particularly desirably 5 mm or less from the standpoint of controlling the particle size and preventing the adhesion of polymers. The shearing force to be applied is, as a rule of thumb, at least 0.005 kilowatt, preferably 0.01 to 500 kilowatt per liter of the reactor volume (V[liter]) in terms of power consumption (P[kw]), i.e.

$$P/V \geq 0.005[kw/l], 0.01 \text{ to } 500(kw/l)$$

The number of revolutions of paddles varies depending on the size of the reactor and the like and is desirably 5 to 500 rpm as a general rule.

The polymerization can be completed by the use of the self-cleaning type reactor of the above-mentioned construction alone, but the polymerization efficiency may be enhanced by arranging in series the aforesaid reactors of the same construction to effect two-stage polymerization. In addition, the two-stage polymerization may be carried out by using the self-cleaning type reactor, followed by an ordinary tank reactor equipped with agitation blades such as helical blades. In such a case, it is desirable to set various conditions so as to complete the agitation in liquid state to the agitation in highly viscous state with applying shearing force in the self-cleaning type reactor as the preceding means and carry out the agitation of solid-state polydispersoid alone in the tank reactor as the following means.

It is particularly desired that polymerization be advanced continuously by making the state in the reactor into the above state (iii), that is, the majority being solid polydispersed material. Such a state in the reactor can be accomplished by controlling amounts of monomers and/or a catalyst to be fed into the reactor and the amount of formed polymers to be discharged from the reactor so as to adjust the proportion of the formed polymers in the reactor to 10% by weight or more, desirably 25% by weight or more, more desirably within the range of 40 to 80% by weight based on the total amount of the monomers and the polymers.

A conversion to polymer for the polymer to be discharged less than 10% causes clogging in the discharge pipe and adhesion of the polymer to the apparatus on the downstream side of the reactor because of high adhesivity of the powder, whereas that more than 95% results in increasing friction of the powder, thus inducing sudden increase in agitation power requirement.

The styrenic polymer ontained by the process according to the present invention has a high degree of syndiotactic configuration. Here, the styrenic polymer which has a high degree of the syndiotactic configuration means that its stereochemical structure is mainly the syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such a high degree of syndiotactic configuration" as mentioned in the present invention means polystyrene, poly(alkylstyrene), poly(halogenated styrene), poly(alkoxystyrene), poly(vinyl benzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. Poly(alkylstyrene) include poly(methylstyrene), poly(ethylstyrene), poly(isopropylstyrene), poly(tert-butylstyrene) etc., poly(halogenated styrene) include poly(chlorostyrene), poly(bromostyrene), poly(fluorostyrene), etc, and poly(alkoxystyrene) include poly(methoxystyrene), poly(ethoxystyrene), etc.

In the process according to the present invention, as illustrated in FIG. 1 the self-cleaning type reactor having the above-mentioned construction is divided in the axis direction into a plurality of zones (n) F1, F2, F3 ... Fn$_2$, each of which is equipped with a jacket J1, J2, J3 ... or Jn$_3$ allowing cooling water to pass therethrough; a monomer feed nozzle M1, M2, M3 ... or Mn$_4$ for feeding the monomer; a catalyst feed nozzle C1, C2, C3 ... or Cn$_1$ for feeding the catalyst; and a means for measuring temperature to measure the temperature in the reactor, for example, a thermocouple T1, T2, T3 ... or Tn$_5$ so as to enable both the starting monomer and the catalyst to be fed dividedly into the reactor.

From the theoretical viewpoint, the more the number of zones, the better the temperature controllability, however, the number of 2 to 5 is suitable taking the apparatus, operation, etc. into consideration. The optimum feed rates of the starting monomer and the catalyst to be fed in the zone F1, F2, F3, ... Fn$_2$ varies depending on the temperature of the monomer to be fed, the set point of the reactor inside temperature, the type of catalyst, etc. However, in the case of dividedly feeding both the monomer and the catalyst, sufficient working effect is achieved by feeding them in each of the zones in a uniformly divided amount, even if not optimum. In the case where both the monomer and the catalyst are dividedly fed, they should be fed through different nozzles from each other. In that case, the feed amount of said catalyst through the first catalyst feed nozzle is preferably 80 to 160%, more preferably 100 to 150% by weight divided by the number of the zones based on the total catalyst amount. Also, the feed amount of said monomer through the first monomer feed nozzle is preferably 80 to 160%, more preferably 100 to 150% by weight divided by the number of the zones based on the total monomer amount. In the case where the monomer is collectively fed in the first zone F1 through the monomer feed nozzle M1 at ordinary temperature and the catalyst is dividedly fed, it is preferable that the catalyst in an amount of 50 to 95% based on the total thereof be fed through the first catalyst feed nozzle C1 and the balance be fed through the other catalyst feed nozzles in amounts each uniformly divided. In the above-mentioned case, other monomer nozzles than M1 need not be installed.

By dividedly feeding into 3 to 5 the starting monomer and the catalyst or the catalyst only in the aforestated manner, the ratio of minimum temperature difference between the reactor inside and the jacket to maximum temperature difference therebetween which has been 1:2 or more in the case of collective feeding of the monomer and the catalyst is made into 1:1.5 or less, thereby enabling the reactor inside temperature to easily be kept uniform, and the feed rates of both the starting monomer and the catalyst be increased as compared with the collective feeding. Thus, the productivity can drastically be enhanced by the process of the present invention.

Prior to the start of polymerization, dried nitrogen gas is preferably introduced into the reactor for sufficient purging and removal of catalyst poison such as water. In addition, it is desirable to provide the means for measuring temperature such as thermocouples in a proper number in the reactor for regulating the reactor temperature to a prescribed value and also to provide the means for controlling the temperature of cooling water to be fed to each of the jackets in accordance with the detected reactor temperature.

In summary, according to the process of the present invention, the reactor inside temperature can easily be regulated to a prescribed level in continuous polymerization by using a catalyst system which causes wide variation in the rate of reaction in a horizontal self-cleaning type reactor effective for producing powdery polymer, whereby the productivity of styrenic polymer can remarkably be enhanced. Accordingly, the process of the present invention is industrially highly valued as a process for efficiently producing styrenic polymers of highly syndiotactic configuration in high purity.

In the following, the present invention will be described in more detail with reference to non-limitative examples and comparative examples.

EXAMPLE 1

A horizontal twin-screw reactor having self-cleaning function (manufactured by Kurimoto Ltd., brand S4-KRC kneader, 100 mm inside diateter (D), shaft length L/D of 7.2, 6.3 liters effective volume, jacket being divided into 3 in axis direction) was cleaned, then the cylinder thereof was heated up to 80° C., and the inside was purged with nitrogen at 10 liters/min. for 3 hours. Thereafter the agitation paddles the reactor was rotated at 50 rpm. At the time when the temperature of the paddles reached 70° C. or higher, the reactor was charged with styrene monomer at ordinary temperature at a total feed rate of 7 liters/hr which had been subjected to nitrogen bubbling, deoxidation and dehydration by passing through an activated alumina column and hydrogenation by passing through a palladium catalyst column, and as the catalyst, methylaluminoxane (MAO), triisobutylaluminum (TIBA), and pentamethylcyclopentadienyltitanium trimethoxide at total feed rates of 66 mmol/hr, 66 mmol/hr, and 0.66 mmol/hr, respectively, by dividing each of them into three equal portions in the direction of the axis of the reactor in the order of catalyst and styrene monomer and by feeding each of the portions at a rate ⅓ of the total feed rate into the reactor through a monomer feed nozzle and catalyst feed nozzle respectively placed at the end of a feed inlet, that is, at feed rates of 2.3 liters/hr styrene monomer, 22 mmol/hr methylaluminoxane, 22 mmol/hr TIBA, and 0.22 mmol/hr pentamethylcyclopentadienyltitanium trimethoxide in each portion of the reactor equally divided into three portions.

Measurements were made of the temperatures of the paddles at three positions by inserting thermocouples into the paddle shaft and placing them closely to the surface of the paddle in the middle thereof in each portion of the reactor equally divided into three in the axis direction. In the initial stage after feeding styrene monomer and the catalyst, the reactor inside temperatures fell temporarily but rose on commencement of reaction. At the time when they reached 75° C., cascade control which links jacket temperatures to reactor inside temperatures was carried out so as to maintain the latter at 75° C., while using a mixture of cooling water and steam as the coolant.

After one hour and a half, a stationary state was attained and the reactor inside temperatures were all controlled to 75°±3° C., followed by continuous discharge of the polymer thus produced, while the jacket temperatures were 45° C., 48° C. and 48° C., respectively in the order of increasing distance from the first feed inlet.

The styrenic polymer thus obtained had the following properties:

Bulk density of polymer powder: 0.40 g/cc
Conversion efficiency: 41.0%
Syndiotacticity: 98.2%
Weight-average molecular weight: 609,000

EXAMPLE 2

After the operation according to Example 1, the polymer production was increased by increasing the feed rate from each of the feed nozzles of styrene monomer to 4.7 liters/hr, that of methylaluminoxane to 50 mmol/hr, that of TIBA to 50 mmol/hr and that of pentamethylcyclopentadienyltitanium trimethoxide to 0.5 mmol/hr, while the jacket temperatures were controlled so that the reactor inside temperatures were maintained at 75°±3° C. When a stationary state was attained, the jacket temperatures were 36° C., 37° C. and 37° C., respectively in the order of increasing distance from the first feed inlet.

The styrenic polymer thus obtained had the following properties:

Bulk density of polymer powder: 0.43 g/cc
Conversion efficiency: 42.0%
Syndiotacticity: 98.3%
Weight-average molecular weight: 575,000

EXAMPLE 3

By the use of the reactor equipped with 3 monomer feed nozzles and 3 catalyst feed nozzles as employed in Example 1, the procedure in Example 1 was repeated except that the styrene monomer was collectively fed through the first nozzle at a feed rate of 7 liters/hr, and catalysts (a mixture of MAO, TIBA and pentamethylcyclopentadienyltitanium trimethoxide (Cp*)) were dividedly fed through 3 nozzles at feed rates of 0.6, 0.2 and 0.2 times the total feed rate thereof (66 mmol/hr of MAO, 66 mmol/hr of TIBA and 0.66 mmol/hr of Cp*) through the first, second and third nozzle, respectively, while the reactor inside temperatures were controlled to 75°±3° C. When a stationary state was attained, the jacket temperatures were 44° C., 43° C. and 45° C., respectively in the order of increasing distance from the first feed inlet.

The styrenic polymer thus obtained had the following properties:

Bulk density of polymer powder: 0.46 g/cc
Conversion efficiency: 46.0%
Syndiotacticity: 98.3%
Weight-average molecular weight: 579,000

EXAMPLE 4

After the operation according to Example 1, the polymer production was increased by doubling each of the feed rates, that is, 14 liters/hr of styrene monomer, 132 mmol/hr of TIBA and 1.32 mmol/hr of Cp*, while the reactor inside temperatures were controlled to 75°±3° C. When a stationary state was attained, the jacket temperatures were 32° C., 29° C. and 31° C., respectively, in the order of increasing distance from the first feed inlet.

The styrenic polymer thus obtained had the following properties:

Bulk density of polymer powder: 0.45 g/cc
Conversion efficiency: 48.0%
Syndiotacticity: 98.3%
Weight-average molecular weight: 612,000

REFERENCE EXAMPLE

The procedure in Example 1 was repeated except that the styrene monomer and the catalysts were collectively fed through the first monomer feed nozzle and the first catalyst feed nozzle, respectively.

After one hour and a half, a stationary state was attained and the reactor inside temperatures were all controlled to 75°±3° C., followed by continuous discharge of the polymer thus produced, while the jacket temperatures were 31° C., 53° C. and 55° C., respectively in the order of increasing distance from the first feed inlet.

The styrenic polymer thus obtained had the following properties:

Bulk density of polymer powder: 0.42 g/cc
Conversion efficiency: 43.0%
Syndiotacticity: 98.4%
Weight-average molecular weight: 583,000

Comparative Example 1

After the operation according to Reference Example, the polymer production was increased by increasing the styrene monomer feed rate to 14 liters/hr and the catalyst feed rate so as to attain a conversion efficiency for the polymer to be discharged of 45%. As a result, the temperature of the cooling water in the jacket for the first feed inlet reached the lower limit of 25° C., making it impossible to maintain the temperature in the first reactor portion at 75° C., whereby the temperature was raised to as high as 101° C. At that time, the feed rates of methylaluminoxane, TIBA and pentamethylcyclopentadienyltitanium trimethoxide were 190, 190 and 1.9 mmol, respectively. The jacket temperature were 25° C. 46° C. and 52° C., respectively in the order of increasing distance from the first feed inlet, while the reactor inside temperatures were 101° C., 78° C. and 75° C., respectively in the order same as above.

The styrenic polymer thus obtained had the following properties:

Bulk density of polymer powder: 0.40 g/cc

Conversion efficiency: 44.%

Syndiotacticity: 97.5%

Weight-average molecular weight: 271,000

Thus, in the case of collectively feeding both the styrene monomer and the catalyst, increase in the feed rates thereof for the purpose of increasing the production made it impossible to maintain the reactor temperatures at prescribed levels. Accordingly, an attempt to increase the production resulted in failure to obtain a polymer having physical properties comparable to those of the polymer produced during the normal operation because of the reactor inside temperatures that were raised above the prescribed levels and also in the deterioration of the catalyst activity due to the above temperature rise.

Comparative Example 2

The procedure in Example 1 was repeated except that the mixture of the styrene monomer and the catalyst was fed in the reactor through the same nozzle. Immediately after feeding the monomer, pressures in the catalyst and monomer feed lines began to increase. Thus, the monomer feeding was discontinued to inspect the lines by dismantling the nozzle. As the result, the polymer was formed at the joining place of the monomer and the catalyst, causing clogging in the nozzle, whereby the supply of the monomer and the catalyst for further running was no longer possible.

REFERENCE EXAMPLE A

The procedure in Example 4 was repeated except that after the operation according to Example 4, the catalysts were dividedly fed through 3 catalyst feed nozzles at feed rates of 0.80, 0.1 and 0.1 times the total feed rate in Example 4 through the first, second and third nozzle, respectively, while the reactor inside temperatures were controlled to 75°±3° C. (at total feed rates of 14 l/hr styrene monomer, 150.0 mmol/hr methylaluminoxane (MAO), 150.0 mmol/hr TIBA and 1.5 mmol/hr pentamethylcyclopentadienyltitanium trimethoxide (Cp*)). When a stationary state was attained, the jacket temperatures were 24° C., 44° C. and 49° C., respectively, in the order of increasing distance from the first feed inlet.

The styrenic polymer thus obtained had the following porperties:

Bulk density of polymer powder: 0.42 g/cc

Conversion efficiency: 41.0%

Syndiotacticity: 98.0%

Weight-average molecular weight: 561,000

EXAMPLE 5

The procedure in Example 4 was repeated except that after the operation according to Reference Example A, the catalysts were dividedly fed through 3 catalyst feed nozzles at feed rates of 0.55, 0.3⁰ and 0.15 times the total feed rate in Example 4 through the first, second and third nozzle, respectively, while the reactor inside temperatures were controlled to 75°±3° C. (at total feed rates of 14 l/hr styrene monomer, 150.0 mmol/hr methylaluminoxane (MAO), 150.0 mmol/hr TIBA and 1.5 mmol/hr pentamethylcyclopentadienyltitanium trimethoxide (Cp*)). When a stationary state was attained, the jacket temperatures were 33° C., 34° C. and 46° C., respectively, in the order of increasing distance from the first feed inlet.

The styrenic polymer thus obtained had the following properties:

Bulk density of polymer powder: 0.42 g/cc

Conversion efficiency: 41.0%

Syndiotacticity: 98.0%

Weight-average molecular weight: 523,000

EXAMPLE 6

After the operation according to Example 2, the feed ratios of the catalysts and styrene monomer were altered to each of the nozzles. Specifically, the catalysts were dividedly fed in the same manner as in Example 2, while the styrene monomer was fed at feed rates of 0.45, 0.30 and 0.25 times the total feed rate in Example 2 through the first, second and third nozzle, respectively, while the reactor inside temperatures were controlled to 75°±3° C. (at total feed rates of 14 l/hr styrene monomer, 150 mmol/hr of MAO, 150 mmol/hr of TIBA and 1.5 mmol/hr of Cp*). When a stationary state was attained, the jacket temperatures were 28° C., 37° C. and 40° C., respectively, in the order of increasing distance from the first feed inlet.

The styrenic polymer thus obtained had the following properties:

Bulk density of polymer powder: 0.44 g/cc

Conversion efficiency: 41.0%

Syndiotacticity: 98.4%

Weight-average molecular weight: 541,000

EXAMPLE 7

(The use of ionic catalyst)

The reactor as used in Example 1 was charged with styrene monomer at ordinary temperature at a total feed rate of 14 liters/hr which had been treated in the same manner as in Example 1 and incorporated with triethylaluminum (TEA) so as to become 1 mmol/l concentration and, as the catalyst, a mixture of N,N-dimethylanilinium tetra(pentafluorophenyl) borate (B), TIBA and Cp* at total feed rates of 2.8 mmol/hr, 56 mmol/hr and 2.8 mmol/hr, respectively, by dividing each of them into three equal portions in the direction of the axis of the reactor in the order of catalyst and styrene monomer and by feeding each of the portions at a rate ⅓ of the total feed rate into the reactor through a monomer feed nozzle and catalyst feed nozzle respectively placed at the end of a feed inlet, that is at feed rates of 4.7 l/hr styrenic monomer, 0.93 mmol/hr B, 19 mmol/hr TIBA and 0.93 mmol/hr Cp* in each portion of the reactor equally divided into three portions.

Subsequently, the reactor was operated in the same manner as in Example 1. After one hour and a half, a stationary state was attained and the reactor inside temperatures were all controlled to 75°±3° C., followed by continuous discharge of the polymer thus produced, while the jacket temperatures were 36° C., 39° C. and 39° C., respectively in the order of increasing distance from the first feed inlet.

The styrenic polymer thus obtrained had the following properties:

Bulk density of polymer powder: 0.35 g/cc

Conversion efficiency: 41.0%

Syndiotacticity: 98.2%

Weight-average molecular weight: 409,000

EXAMPLE 8

The procedure in Example 7 was repeated except that the styrene monomer was collectively fed through the first monomer feed nozzle at 14 l/hr and the catalysts were dividedly fed through 3 catalyst feed nozzles at feed rates of 0.8, 0.1 and 0.1 times the total feed rate in Example 8 through the first, second and third nozzle, respectively, while the reactor inside temperatures were controlled to 75°±3° C. When a stationary state was attained, the jacket temperatures were 31° C., 35° C. and 42° C., respectively, in the order of increasing distance from the first feed inlet.

The styrenic polymer thus obtained had the following properties:

Bulk density of polymer powder: 0.34 g/cc

Conversion efficiency: 41.0%

Syndiotacticity: 97.9%

Weight-average molecular weight: 397,000

What is claimed is:

1. A process for continuously producing a styrene polymer having a degree of syndiotacticity such that the proportion of racemic diad in the polymer is at least 75% by continuously feeding a styrenic monomer as the starting material and a catalyst into a horizontal self-cleaning reactor, which is divided into a plurality of at least two portions in the axial direction, which process comprises:

feeding said catalyst and said styrene monomer through separate feed lines into the reactor having an inside temperature of 0°–120° C. such that (i) the catalyst is divided and fed into the reactor through at least first and second feed nozzles into the at least first and second portions of the reactor while monomer is fed into the first portion of the reactor through a monomer feed nozzle or such that (ii) each of the catalyst and styrene monomer feeds is divided wherein the divided catalyst is fed into at least the first and second portions of the reactor through at least first and second catalyst feed nozzles and wherein the divided monomer is fed into the at least first and second portions of the reactor through at least first and second monomer feed nozzles, each of said portions being equipped with a jacket which allows cooling water to pass therethrough, and the ratio of the minimum temperature difference between inside of the reactor and the jacket to the maximum temperature difference therebetween being 1:1.5 or less.

2. The process according to claim 1, wherein each of said catalyst and said styrenic monomer are divided into at least two portions and fed through the first catalyst feed nozzle and the first monomer feed nozzle, respectively, the proportion of the amount (wt) of said catalyst fed through the first catalyst feed nozzle relative to the remaining amount (wt) of the catalyst fed to the reactor ranges from 80 to 160% and the proportion of the amount (wt) of said styrenic monomer fed through the first monomer feed nozzle relative to the remaining amount (wt) of the monomer fed to the reactor ranges from 80 to 160%.

3. The process according to claim 2, wherein the proportion of the amount of said catalyst fed through the first catalyst feed nozzle relative to the remaining amount of the catalyst fed to the reactor ranges from 100 to 150%.

4. The process according to claim 2, wherein the proportion of the amount of said monomer fed through the first monomer feed nozzle relative to the remaining amount of the monomer fed to the reactor ranges from 100 to 150%.

5. The process according to claim 1 wherein said catalyst or both said catalyst and said styrenic monomer are divided into 2 to 5 portions.

6. The process according to claim 1 wherein (i) only said catalyst is divided into at least two portions, and 50 to 95% by weight of the total amount of catalyst is fed through the first catalyst feed nozzle.

* * * * *